Figure 1:
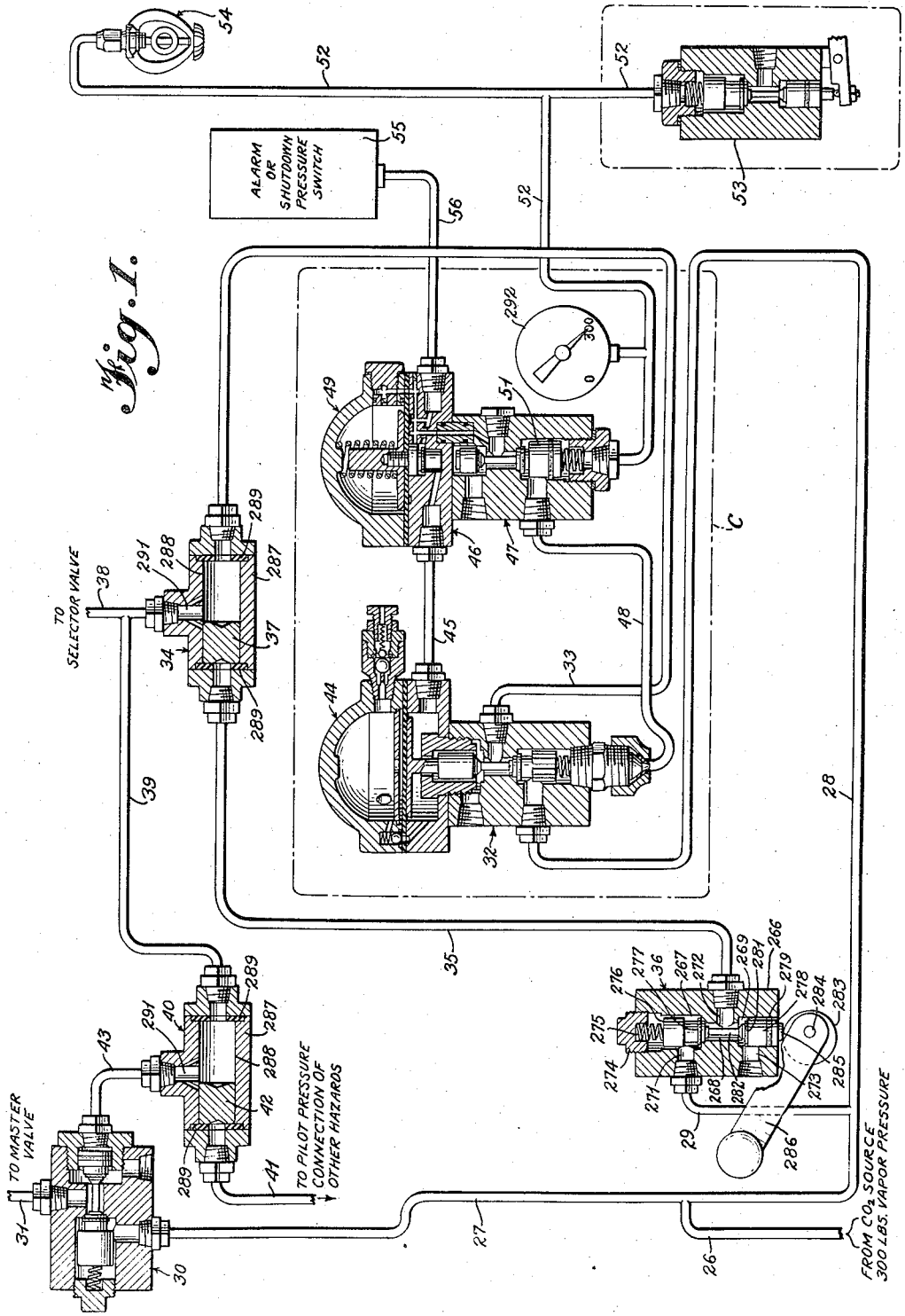

March 24, 1959     H. F. ROBERTS     2,878,879
MECHANICAL TIMER CONTROL FOR FIRE EXTINGUISHING SYSTEM
Filed April 16, 1957     8 Sheets—Sheet 1

March 24, 1959 H. F. ROBERTS 2,878,879
MECHANICAL TIMER CONTROL FOR FIRE EXTINGUISHING SYSTEM
Filed April 16, 1957 8 Sheets-Sheet 2
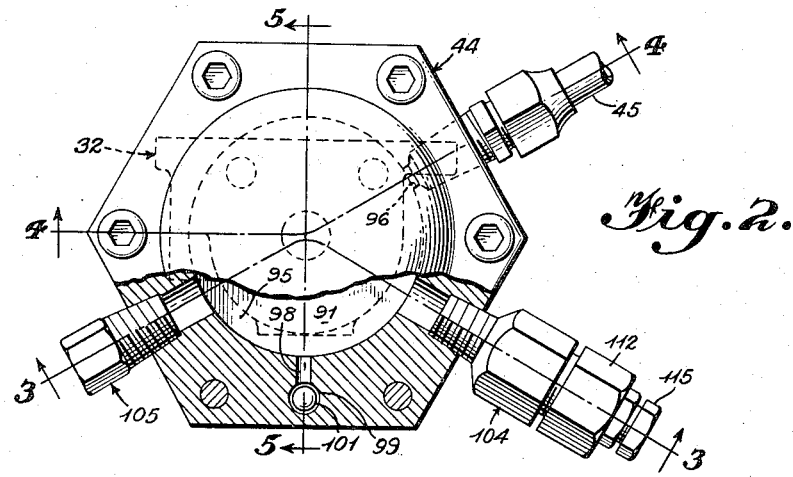
Fig. 2.
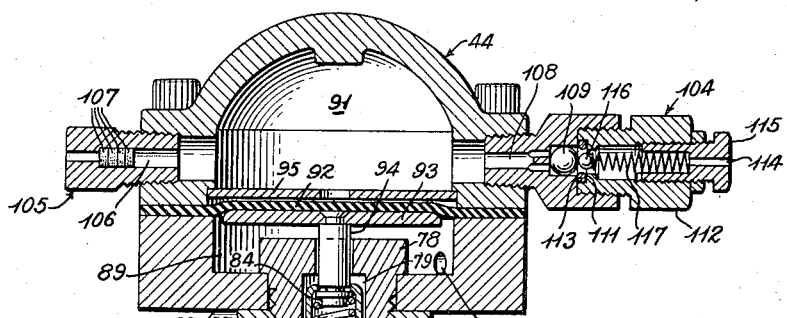
Fig. 3.
Fig. 6.
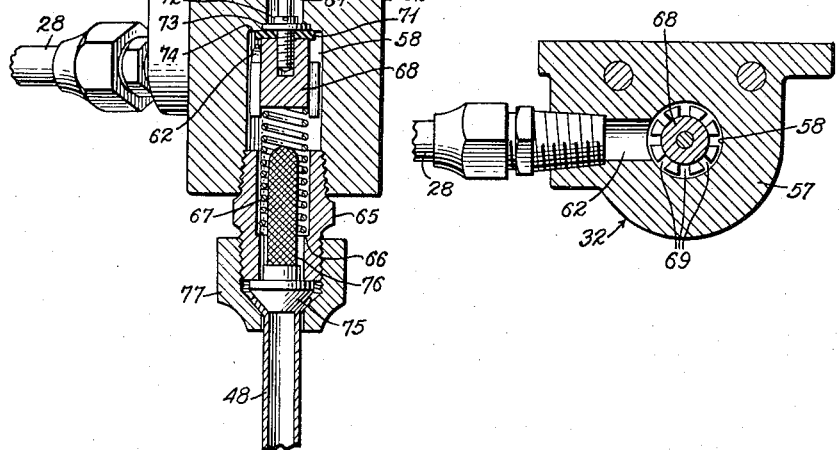

March 24, 1959     H. F. ROBERTS     2,878,879
MECHANICAL TIMER CONTROL FOR FIRE EXTINGUISHING SYSTEM
Filed April 16, 1957     8 Sheets-Sheet 3
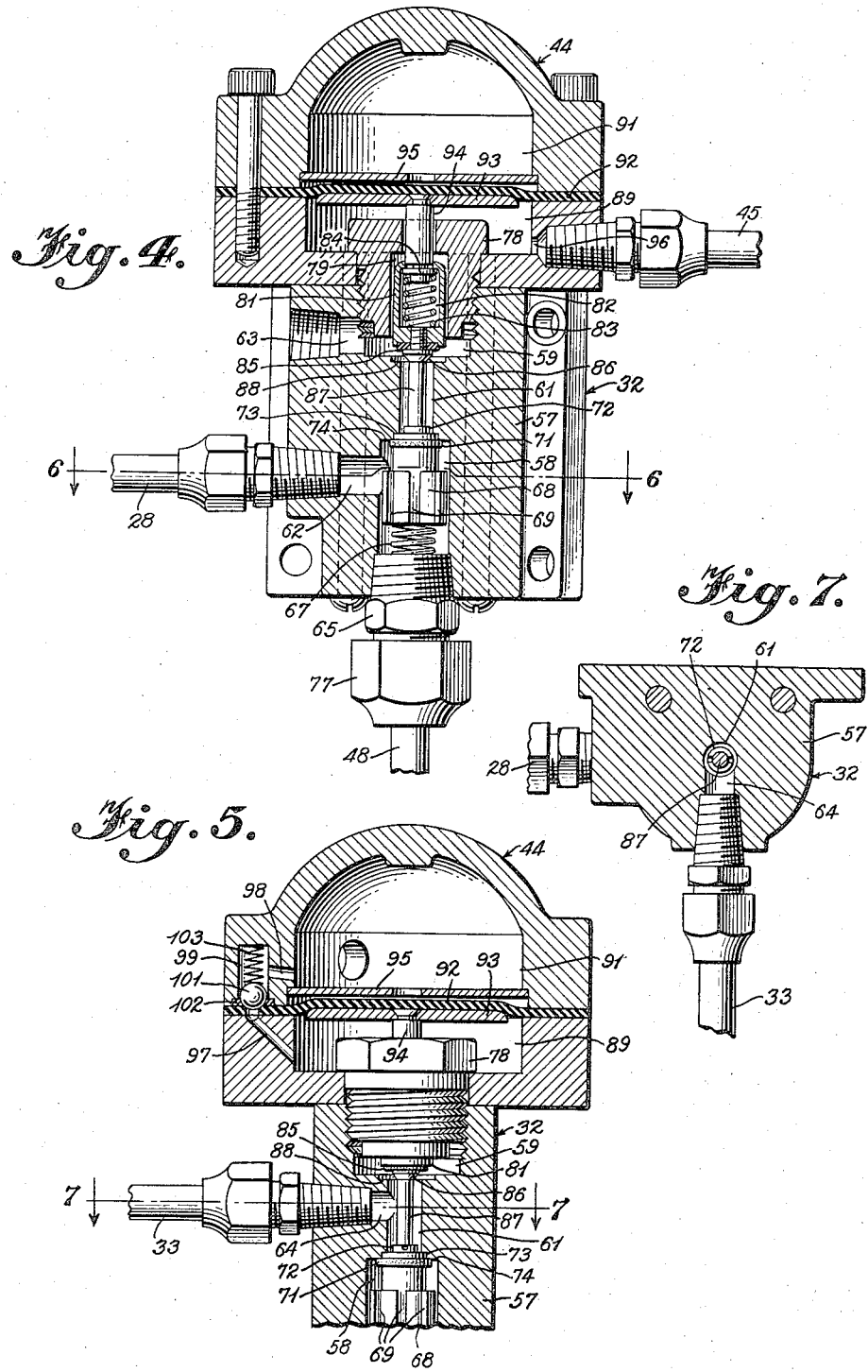

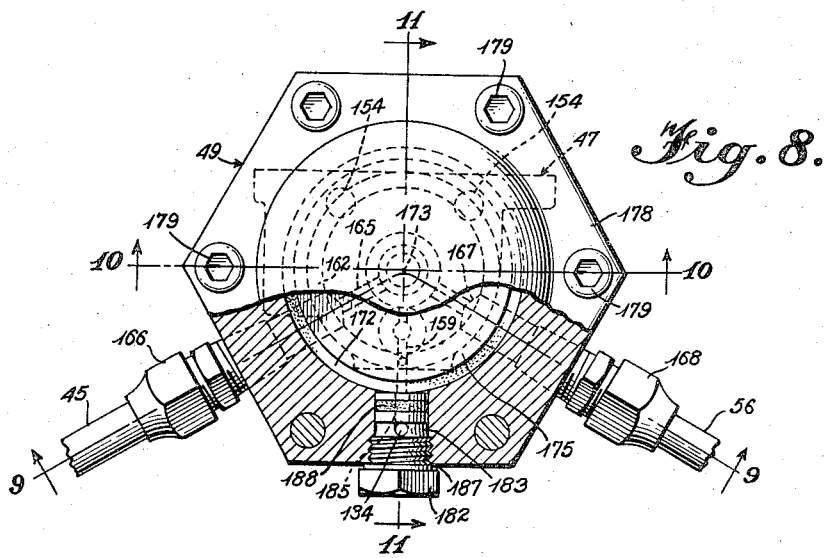

March 24, 1959 H. F. ROBERTS 2,878,879
MECHANICAL TIMER CONTROL FOR FIRE EXTINGUISHING SYSTEM
Filed April 16, 1957 8 Sheets-Sheet 5

March 24, 1959      H. F. ROBERTS      2,878,879
MECHANICAL TIMER CONTROL FOR FIRE EXTINGUISHING SYSTEM
Filed April 16, 1957      8 Sheets-Sheet 6
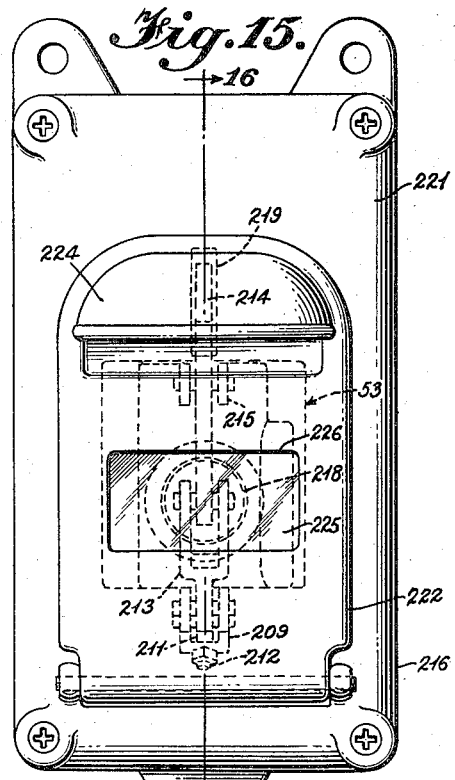
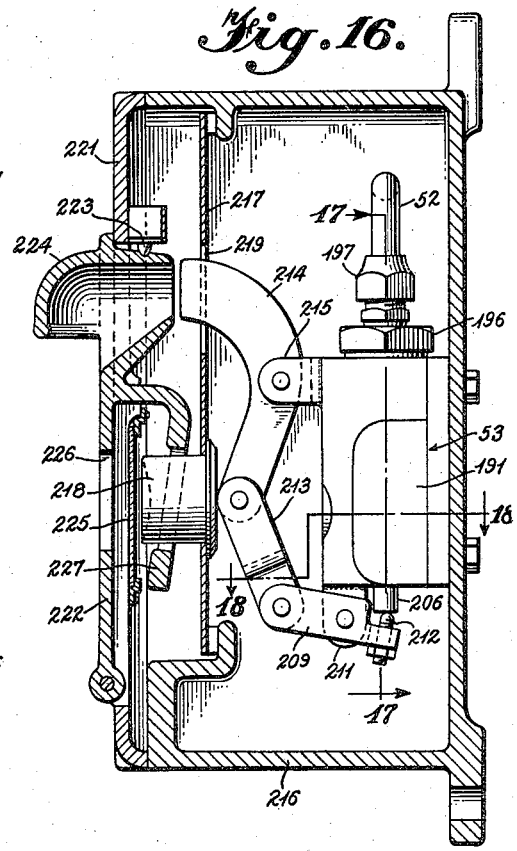
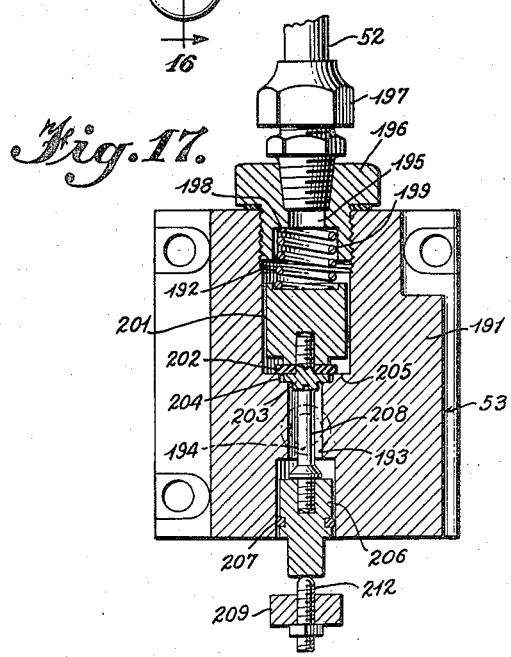
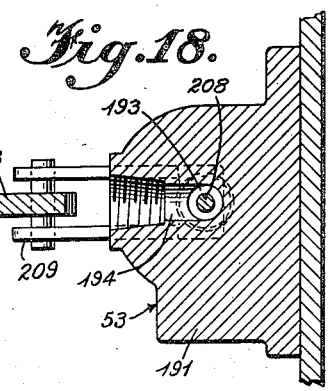

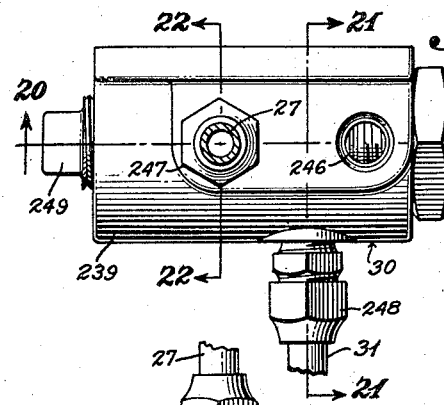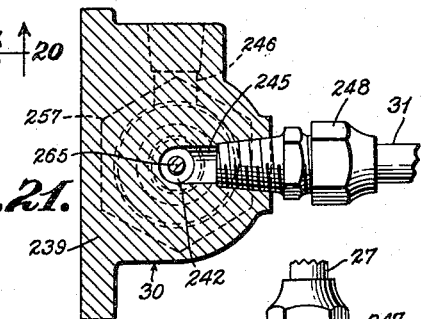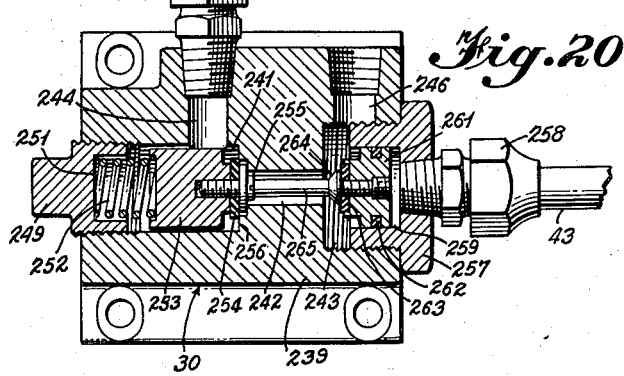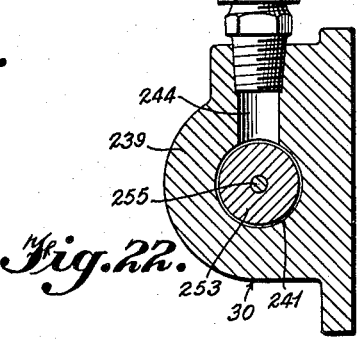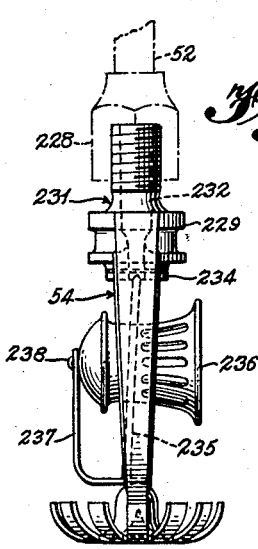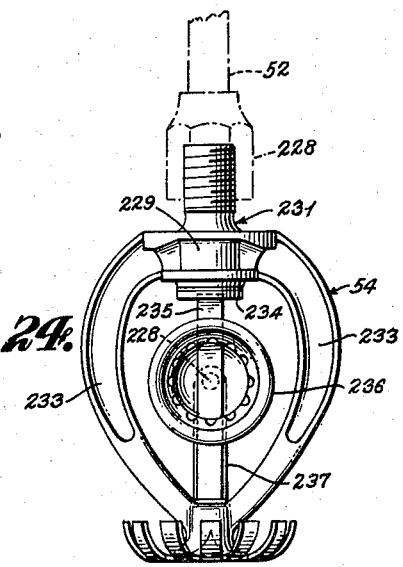

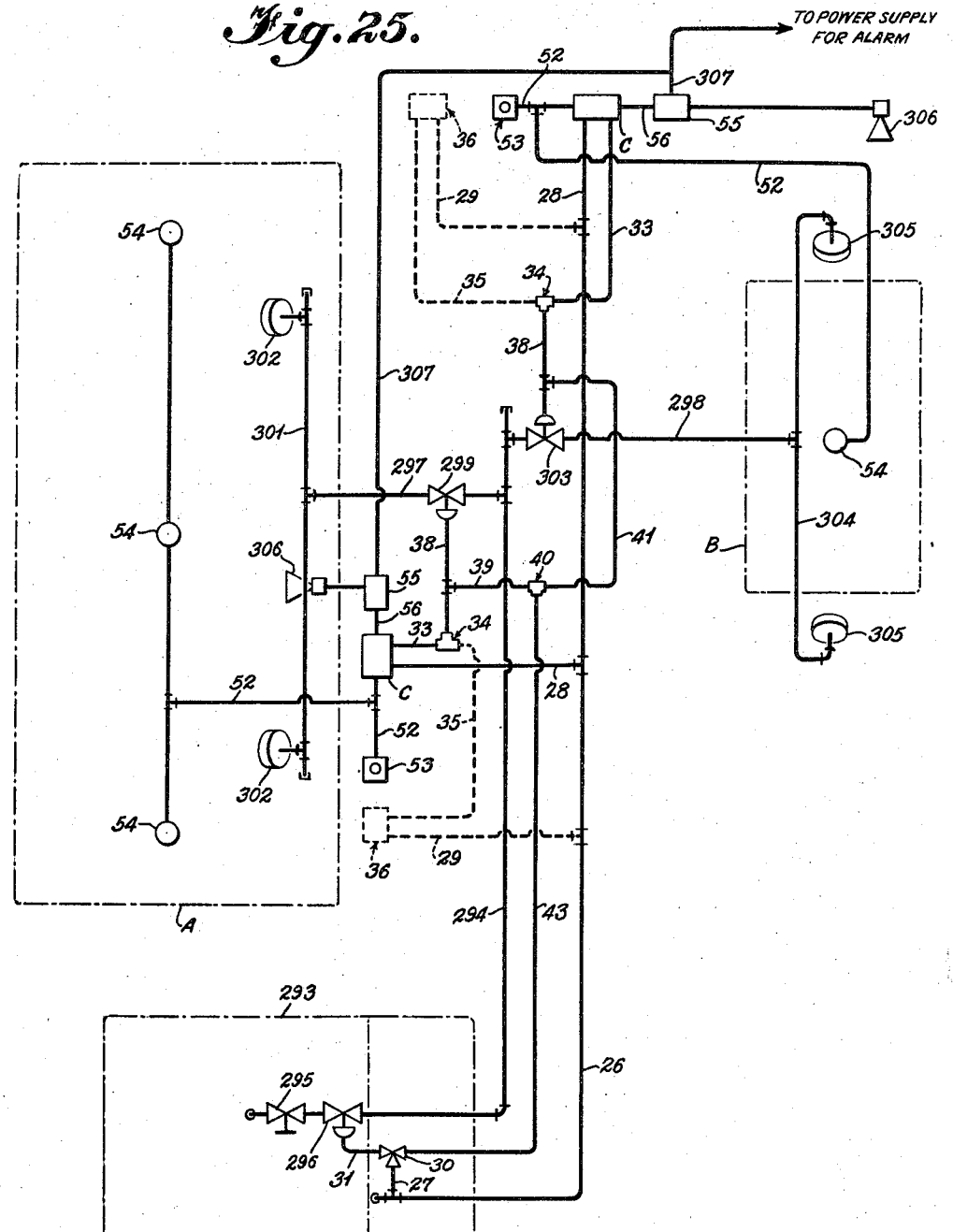

United States Patent Office 2,878,879
Patented Mar. 24, 1959

2,878,879

MECHANICAL TIMER CONTROL FOR FIRE EXTINGUISHING SYSTEM

Harold F. Roberts, Park Ridge, Ill., assignor, by mesne assignments, to Chemetron Corporation, Chicago, Ill., a corporation of Delaware Application April 16, 1957, Serial No. 653,172

16 Claims. (Cl. 169—11)

This invention relates to new and useful improvements in fire extinguishing systems and deals more particularly with systems in which the discharge of fire extinguishing medium maintained under pressure in automatically or manually controlled by a mechanism that is powered by the pressure of the extinguishing medium to provide a timed delay between the actuation of the mechanism and the initiation of the discharge and a timed discharge of the medium.

Fire extinguishing systems employing an extinguishing medium such as carbon dioxide are frequently controlled in such a manner that personnel within an enclosed hazard are given sufficient time after actuation of the system to vacate the hazard before discharge of the medium is initiated. This predischarge delay is usually of fixed duration and is generally followed by a timed discharge of the extinguishing medium.

Known types of predischarge and discharge timing mechanisms have been dependent upon a source of electrical power which, particularly at the time of a fire or an explosion, could be subject to failure. Other timing mechanisms have been operated by the pressure of the fire extinguishing medium in response to the manual operation of a control valve. In times of emergency, however, reliance upon manual actuation of the mechanism has always involved a risk that the person responsible might neglect to, or be unable to, actuate the mechanism.

It is the primary object of this invention to provide a device for controlling the operation of a fire extinguishing system in such a manner that it is automatically actuated when a fire occurs, the discharge of the extinguishing medium being delayed for a predetermined time interval after the system is actuated and the control device being operated independently of any power source apart from the system.

A further important object of the invention is to provide a device which is either manually or automatically actuated and which, at the end of a delay period of predetermined duration following said actuation, will initiate a timed discharge of fire extinguishing medium, the device being operated to time the predischarge delay and the discharge period by the pressure of the medium.

Another object of the invention is to provide a pressure fluid operated control device which may be either manually or automatically actuated to initiate a timed discharge of fire extinguishing medium following the elapse of a predetermined delay period after actuation of the device.

Still another object of the invention is to provide a pressure fluid operated device for automatically controlling the actuation of a fire extinguishing system so that discharge of the extinguishing medium is delayed for a timed period after the control device is set into operation and the discharge period is timed, the control device being manually operable to effect the discharge of the extinguishing medium for a period of indefinite duration.

Other objects and advantages of the invention will be apparent during the course of the following description.

Figure 10:
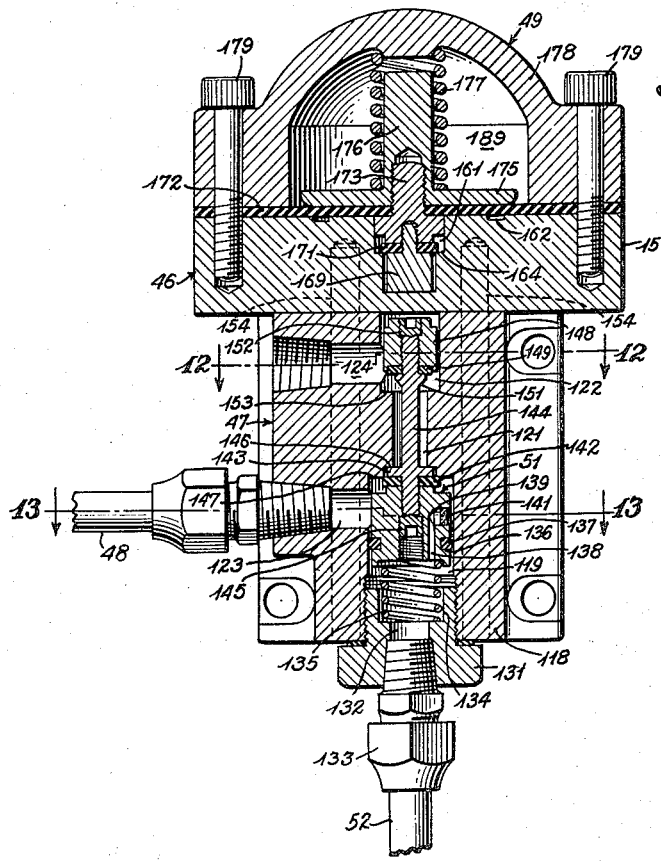
Figure 14:
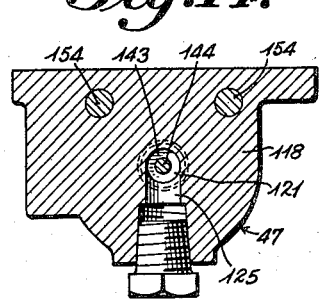
Figure 13:
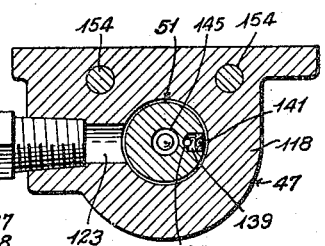
Figure 11:
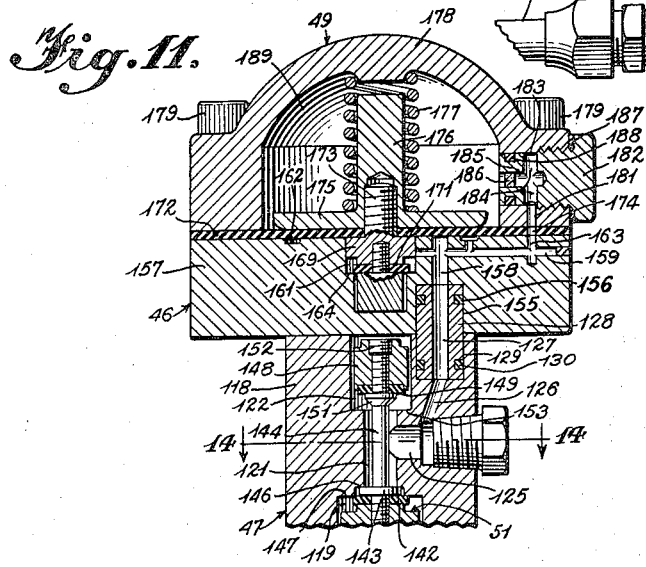

In the accompanying drawings forming a part of this specification and in which like reference characters are employed to designate like parts throughout the same, Figure 1 is a diagrammatic view of the control device, Figure 2 is a top plan view, partly broken away, of the pilot valve assembly for controlling the length of the discharge period, Figure 3 is a vertical sectional view taken on line 3—3 of Fig. 2, Figure 4 is a vertical sectional view taken on line 4—4 of Fig. 2, Figure 5 is a vertical sectional view taken on line 5—5 of Fig. 2, Figure 6 is a horizontal sectional view taken on line 6—6 of Fig. 4, Figure 7 is a horizontal sectional view taken on line 7—7 of Fig. 5, Figure 8 is a top plan view, partly broken away, of the valve assembly for controlling the length of the delay interval, Figure 9 is a vertical sectional view taken on line 9—9 of Fig. 8, Figure 10 is a vertical sectional view taken on line 10—10 of Fig. 8, Figure 11 is a vertical sectional view taken on line 11—11 of Fig 8, Figure 12 is a horizontal sectional view taken on line 12—12 of Fig. 10, Figure 13 is a horizontal sectional view taken on line 13—13 of Fig. 10, Figure 14 is a horizontal sectional view taken on line 14—14 of Fig. 11, Figure 15 is a front elevational view of the push-button station for manually actuating the control device, Figure 16 is a vertical sectional view taken on line 16—16 of Fig. 15, Figure 17 is a vertical sectional view taken on line 17—17 of Fig. 16, Figure 18 is a horizontal section view taken on line 18—18 of Fig. 16, Figure 19 is a side elevational view of the master pilot valve which controls operation of the master valve of a fire extinguishing system, Figure 20 is a longitudinal sectional view taken on line 20—20 of Fig. 19, Figure 21 is a transverse sectional view taken on line 21—21 of Fig. 19, Figure 22 is a transverse sectional view taken on line 22—22 of Fig. 19, Figure 23 is a side elevational view of the device employed for automatically actuating the control device, Figure 24 is a front elevational view of the actuating device of Fig. 23 and Figure 25 is a schematic view of a fire extinguishing system embodying the invention.

In the drawings wherein for the purpose of illustration is shown the preferred embodiment of the invention, and first particularly referring to Fig. 1, there is shown a diagrammatic arrangement of the elements employed for controlling the operation of that portion of a fire extinguishing system associated with one of the hazards protected by the system. In other words, the control device diagrammatically illustrated in Fig. 1 is employed to control the discharge of fire extinguishing medium to one hazard protected by a single or multiple hazard fire extinguishing system. The relationship between the elements illustrated in Fig. 1 and the remainder of a multiple hazard fire extinguishing system will be more fully described at a later point in this specification. It is felt, however, that a brief description of the function of the various elements and the interrelationship between the component parts of the control device will aid in an understanding of the detailed descriptions to follow.

Leading from the vapor space of a source of supply of liquid carbon dioxide at a pressure of, for example, 300 pounds per square inch, is a vapor supply pipe 26 which is in turn connected to a first branch pipe 27, a second branch pipe 28 and a third branch pipe 29. The first branch pipe 27 leads to a pressure fluid operated master pilot valve 30 which is normally closed and has its outlet connected by a pipe 31 to the operating port of a pressure fluid operated master valve, as will be later described.

The second branch pipe 28 leads to a pilot valve assembly 32 which is normally closed to prevent the flow of carbon dioxide vapor therethrough. The outlet of the pilot valve assembly 32 is connected through a pipe 33 to one inlet of the shuttle valve 34. The other inlet of the shuttle valve 34 is connected by a pipe 35 to the outlet of a manual override valve 36 the inlet of which is connected to the third branch pipe 29. Alternate flow paths are provided between the vapor supply pipe 26 and the shuttle valve 34 through the second branch pipe 28, pilot valve assembly 32 and pipe 33, or through the third branch pipe 29, manual override valve 36 and pipe 35. When either of these flow paths is opened, the shuttle member 37 of the shuttle valve 34 will move to a position at which the open flow path is placed in direct communication of the outlet of the shuttle valve. The outlet of the shuttle valve 34 is connected by a pipe 38 to the operating port of a piston operated selector valve, as will be later described, and through a pipe 39 to one inlet port of a shuttle valve 40. The other inlet port of the shuttle valve 40 is connected by a pipe 41 to the outlet port of the shuttle valve 34 associated with the control device of another hazard protected by the system so that when either of the two shuttle valves 34 has carbon dioxide vapor flowing therethrough, the vapor will reach the shuttle valve 40 and will move the shuttle member 42 to a position to permit flow of the vapor from the outlet of the valve 40 and through the pipe 43 to the operating port of the pressure fluid operated pilot valve 30 to open this normally closed valve.

Operation of the pilot valve assembly 32 is controlled by an operating device 44 which is so designed as to open the pilot valve after a charge of pressure fluid has been admitted through the pipe 45 and the admission of said charge has been stopped and to close the valve after it has been open for a given period of time. The charge of pressure fluid is admitted to the pipe 45 through a control valve 46 and an actuating valve 47 which are arranged in series and receive a supply of carbon dioxide vapor through the pipe 48 which is in communication with the supply source through the pilot valve assembly 32, the second branch pipe 28 and vapor supply pipe 26. The control valve 46 is operated by a device 49 that is so designed as to open the control valve immediately upon the admission of pressure fluid to the device 49 and to close the control valve after the elapse of a predetermined time interval following the admission of pressure fluid to the device 49.

Pressure fluid is admitted to the operating device 49 when the actuating valve 47 is opened by the valve operating piston 51. The piston 51, however, normally is urged in a direction to close the actuating valve 47 by the pressure of the carbon dioxide vapor acting thereon and is movable to open the actuating valve only by the sudden venting of carbon dioxide vapor through the venting tube 52.

The tube 52 is connected to a manually operated venting valve 53 and to a venting head 54 either of which may be opened to vent the carbon dioxide vapor from the tube 52. The venting head 54, however, is so designed as to automatically open and vent carbon dioxide from the tube 52 when a fire occurs at the hazard protected by the portion of the extinguishing system associated with the control device and the manually operated venting valve 53 can be opened only by an operator at the location of the valve.

A pressure switch 55 is connected by a pipe 56 to the flow path between the actuating and control valves 47 and 46, respectively, so that immediately upon opening of the actuating valve 47 the switch will be operated to energize a suitable alarm if personnel are working in the area of the hazard, or to close down any equipment operating in the hazard area, as will be later described.

Before describing the manner in which the control device operates, it will be noted that a piston operated master valve is employed in a conventional extinguishing system for controlling the flow of carbon dioxide from a supply source into a header that may be selectively connected to any one of a number of hazards, and that a piston operated selector valve controls the flow of carbon dioxide from the header to a specific hazard.

Assuming then that a fire occurs in the hazard with which the control device of Fig. 1 is associated, the venting head 54 will automatically open to release carbon dioxide vapor from the venting tube 52 or, if the fire is noticed by personnel in the area before the venting head is actuated, the manually operated venting valve 53 may be opened to vent vapor from the tube 52. In either event, when the vapor is vented from the tube 52, the piston 51 will open the actuating valve 47 and admit carbon dioxide vapor to the pressure switch 55 and to the operating device 49 of the control valve 46. The pressure switch 55 will thereupon immediately close a circuit to sound an alarm so that personnel in the hazard area may leave or be evacuated. Of course, the switch 55 may also be so conducted as to shut down any equipment operating in the hazard area. The operating device 49 also will immediately open the control valve 46 to permit the flow of a charge of carbon dioxide vapor through the tube 45 to the operating device 44 of the pilot valve assembly 32.

After a predetermined time interval following the opening of the actuating valve 47, the control valve 46 will be closed by its operating device 49 and the admission of the charge to the operating device 44 will be stopped. The operating device 44 will thereupon immediately open the pilot valve assembly 32 so that carbon dioxide vapor will flow through the pipe 33 to the shuttle valve 34 and from the shuttle valve 34 to the selector valve associated with the hazard and to the shuttle valve 40. From the shuttle valve 40, carbon dioxide vapor will flow through the pipe 43 to the operating port of the master pilot valve 30 to open this valve and permit the flow of vapor through the first branch pipe 27, and through the pipe 31 to open the piston operated master valve so that carbon dioxide may flow from the supply source into the header and to the now open selector valve associated with the hazard protected by the control device.

The carbon dioxide flowing through the header and through the selector valve will thereupon be discharged to the hazard and this discharge will continue for a predetermined time interval until the operating device 44 has again closed the pilot valve assembly 32. This closing of the pilot valve assembly 32 will permit the carbon dioxide vapor to be released through the pipe 33 and pilot valve assembly so that the selector valve and master pilot valve 30 will be returned to their initial positions and the master valve will be returned to its initial position by venting of the vapor through the pipe 31 and from the master pilot valve. If an additional discharge of carbon dioxide into the hazard is desired, the manual override valve 36 may be opened to admit carbon dioxide vapor directly from the source to the selector valve and to the master pilot valve 30, the latter valve admitting vapor from the source to operate the master valve. The manual override valve 36, therefore, bypasses the pilot valve assembly 32, control valve 46 and actuating valve 47 to completely eliminate the predischarge and discharge timing functions of the control device.

After the control device has been operated to effect discharge of carbon dioxide into a hazard as described above, the actuating valve 47 will remain in an open condition and the control valve 46 in its closed position until the system has been reset by closing either the venting head 54 or the manually operated venting valve 53, whichever has been opened, so that pressure operating on the piston 51 will again return the actuating valve to its closed position. The pressure of the carbon dioxide vapor in the operating device 49 will thereupon be quickly released and the control device thereby conditioned for subsequent operations.

Referring now to Figs. 2 to 7, inclusive, for a detail description of the pilot valve assembly 32 and its operating device 44, the body 57 of the valve is formed with an inlet chamber 58, an exhaust chamber 59 and an outlet chamber 61 that is positioned between the inlet and exhaust chambers. The inlet chamber 58 is connected through the inlet port 62 to the second branch pipe 28 and through the second branch pipe to the carbon dioxide vapor supply pipe 26. An exhaust port 63 provides open communication between the exhaust chamber 59 and the atmosphere and an outlet port 64 provides communication between the outlet chamber 61 and the pipe 33.

The outer end opening of the inlet chamber 58 has threaded therein a union 65 the internal passageway of which is shouldered at 66 to provide a seat for the spring 67 which is compressed between the seat and the piston type valve member 68 that is positioned in the chamber 58. The valve member 68 has a plurality of longitudinally extending slots 69 spaced around its outer surface, as best illustrated in Figs. 5 and 6, to permit the free flow of carbon dioxide vapor past the valve member to the outer end of the inlet chamber 58. The inner end portion of the valve member 68 is reduced in diameter and has mounted thereon a sealing gasket 71 that is clamped against the end of the valve member by the enlarged head of a screw 72 that is threaded into the valve member. The head of the screw 72 is adapted to seat in the rabbeted end 73 of the outlet chamber 61 so that the sealing gasket 71 can seat against the end wall 74 of the inlet chamber 58 to seal between the inlet and the outlet chambers.

Mounted in abutting relationship with the outer end of the union 65 is a tapered coupling member 75 which has a passageway therethrough and which carries a strainer 76 projecting into the passageway through the union to remove any foreign material from the carbon dioxide vapor flowing through the union and the coupling member 75. The pipe 48 has one of its end portions flared and clamped against the tapered surface of the coupling member 75 by a coupling nut 77 that is threaded onto the outer end portion of the union 65.

The pilot valve operating device 44 is mounted on the valve body 57 adjacent the exhaust chamber 59 by means of a connector 78 which is threaded into the outer end of the exhaust chamber. The inner end of the connector 78 is provided with an enlarged bore 79 into which is loosely fitted a plunger 81 with a sufficient clearance to permit the passage of gases. The plunger 81 has formed therein an upwardly opening chamber 82 in which is positioned a compressed spring 83 that is retained in place by a plug 84. The inner end of the plunger 81 has mounted thereon a sealing washer 85 that is clamped against the end of the plunger by a collar 86 of the operating rod 87 which is threaded into the end wall of the plunger and extends into operating engagement with the head of the screw 72. The washer 85 is movable when the plunger 81 is moved inwardly to place the washer in engagement with the shoulder 88 at the adjacent end of the outlet chamber 61 and to provide sealing between the outlet and exhaust chambers. Inward movement of the plunger 81 will also cause the operating rod 87 to move the valve member 68 into its open position.

The pilot valve operating device 44 is rigidly clamped in sealing engagement with the top of the body 57 by the head of the threaded connector 78. The chambered interior of the operating device 44 is divided into an inner portion 89 and an outer portion 91 by a flexible diaphragm 92. A disc 93 is positioned adjacent the diaphragm 92 in the inner portion 89 of the chamber and is provided with a pin 94 that extends from the disc through the outer end of the threaded connector 78 for engagement with the spring retaining plug 84 of the plunger 81. Sufficient clearance is provided between the outer surface of the pin 94 and the end bore of the connector 78 to permit restricted passage of gases therethrough. Fastened above the diaphragm 92 is a perforated disc 95 for engaging the diaphragm to prevent excessive upward movement thereof.

When the disc 93 is moved by the diaphragm 92 in a direction to depress the pin 94, the engagement between the pin and the spring retaining plug 84 will cause the plunger 81 to move the washer 85 into sealing engagement with the shoulder 88. Further movement, or overtravel, of the pin 94 is made possible by movement of the retaining plug 84 to further compress the spring 83 and to thereby prevent damage to the washer 85. It will be readily apparent that the spring 83 must be of sufficient strength to insure positive sealing engagement between the washer 85 and the shoulder 88 against the maximum force exerted by the pressure of the gas in the chamber 61.

The inner portion 89 of the chambered interior of the operating device 44 is in communication with the duct 45 through the supply port 96. The inner and outer portions 89 and 91 of the chambered interior of the operating device 44 are in communication with each other through passageways 97 and 98 and the valve chamber 99 in the wall of the device, as illustrated in Fig. 5. A ball check valve 101 is provided in the valve chamber 99 and is urged into its seated position against the O-ring 102 by a spring 103 to permit the unidirectional flow of gases from the inner portion 89 to the outer portion 91. Venting of the outer portion 91 of the chambered interior of the operating device 44 is provided by a venting valve 104 and by a venting plug 105 having a shouldered passageway 106 therethrough into which are fitted a plurality of discs 107 which may be formed of porous stainless steel, or the like. The porous discs 107 permit the continuous restricted flow of gas through the passageway 106 in the plug 105 and the venting valve 104 permits relatively rapid venting until the pressure in the outer portion 91 of the chambered interior of the operating device 44 is increased to a value sufficiently high to effect closing of the valve, after which the venting valve will remain closed until the pressure in the outer portion is reduced to a predetermined value.

The venting valve 104 is formed with a passageway 108 having an enlarged portion into which a ball check valve 109 is inserted with sufficient clearance between the ball and the enlarged passageway to permit the limited flow of gas therethrough. At the outer end of the enlarged portion of the passageway 108 a valve seat 111 is provided by the chambered cap 112 and an O-ring 113 is positioned adjacent the seat to provide sealing between the ball valve 109 and its seat. Gases flowing past the ball valve 109 in the enlarged portion of the passageway 108 are released from the valve through the port 114 that is provided in the plug 115 that is threaded into the outer end portion of the chambered cap 112. Positioned in the chambered interior of the cap 112 between the plug 115 and the ball check valve 109 is a ball 116 which is acted upon by a spring 117 to engage the valve 109 and to move the valve away from its seated position. The outer end of the spring 117 bears against the plug 115 the position of which may be adjusted to vary the pressure exerted by the spring against the ball 116 and ball check valve 109. In other words, the position of the plug 115 may be changed to vary the value of the pressure to which the gas in the outer portion 91 of the operating device 44 must be reduced before the spring 117 will move the ball valve 109 into its open position.

The operation of the pilot valve assembly 32 and its operating device 44 will be described in detail as follows:

Assuming that a charge of carbon dioxide vapor is admitted through the pipe 45 into the inner portion 89 of the operating device 44 at a greater rate than the carbon dioxide vapor can be released through the clearance space surrounding the rod 94 and plunger 81 and their adjacent surfaces of the connector 78, the pressure within both the inner and outer portions 89 and 91, respectively, of the operating device will increase at a relatively rapid rate due to the flow of vapor through the passageways 97 and 98 past the ball check valve 101. This rapid increase in the pressure of the vapor in the outer portion 91 of the operating device 44 will cause the ball valve 109 to move to its seated position to close the passageway 108. During this period of admission of the charge through the pipe 45, the pressure acting on opposite sides of the diaphragm 92 will be substantially equal and the disc 93 and its associated rod 94 will remain in a position at which the sealing gasket 71 is in sealing engagement with the end wall 74 to seal between the inlet and outlet chambers 58 and 61, respectively, and the sealing washer 85 will remain out of engagement with its seating surface 88 so that the outlet and exhaust chambers 61 and 59, respectively, will remain in open communication with each other.

After the charge of carbon dioxide vapor has been introduced to the operating device 44 through the pipe 45 and the admission of the charge has been stopped, the pressure in the inner portion 89 of the operating device will be quickly vented through the clearance space between the rod 94 and plunger 81 and their associated surfaces of the connector 78 and through the exhaust port 63. The pressure of the vapor within the outer portion 91 of the operating device 44 will thereupon move the diaphragm 92, disc 93 and rod 94 to depress the plunger 81 and to thereby move the sealing washer 85 into seated relationship against its seating surface 88. This movement of the plunger 81 will also cause the operating rod 87 to move the valve member 68 to a position at which the sealing gasket 71 is spaced from the end wall 74 of the inlet chamber 58 so that the inlet chamber is in open communication with the outlet chamber 61. The pilot valve 32 is thereby opened to permit the free flow of carbon dioxide vapor from the second branch pipe 28 to the pipe 33.

The pilot valve assembly 32 will remain in its above described open position until the pressure of the carbon dioxide vapor in the outer portion 91 of the operating device 44 has been reduced to a predetermined value by the restricted flow of vapor through the porous discs 107 in the venting plug 105. When the pressure in the outer portion 91 has been reduced to the aforesaid predetermined value, the ball 116 acting against the ball check valve 109 under the force of the spring 117 will move the ball check valve into its open position so that the remaining vapor in the outer portion will quickly flow through the passageway 108 to reduce the pressure in the outer portion to atmospheric pressure. The diaphragm 92 is thereupon once again acted upon by substantially equal pressures in both the inner and outer portions 89 and 91, respectively, so that the spring 67 acting against the valve member 68 will return the sealing gasket 71 to a position in sealing engagement with the end wall 74 and the sealing washer 69 will be moved out of engagement with the seating surface 88. The pilot valve assembly 32, therefore is responsive to the admission of a charge of carbon dioxide vapor thereto and a subsequent stopping of the admission of this charge to first open the pilot valve and after a predetermined time interval to again close the pilot valve.

Referring now to Figs. 8 to 14, inclusive, for a detail description of the actuating and control valves 47 and 46, respectively, it will be seen that the actuating valve has a body 118 formed with an inlet chamber 119, an outlet chamber 121 and an exhaust chamber 122. The inlet chamber 119 is connected through an inlet port 123 to the pipe 48 that is in open communication through the pilot valve assembly 32 with a source of supply of carbon dioxide vapor. An exhaust port 124 provides open communication between the exhaust chamber 122 and the atmosphere and an outlet port 125 provides communication between the outlet chamber 121 and a passageway 126 that is formed in the valve body 118. The outer end of the passageway 126 is aligned with the bore 127 of a coupling sleeve 128 which is seated in a recess 129 formed in the top of the valve body 118. A seal is provided between the sleeve 128 and the recess wall by an O-ring 130.

The outer end opening of the inlet chamber 119 has threaded therein an adaptor 131 having a passageway 132 therethrough the outer end portion of which is internally threaded for receiving the coupling member 133 by means of which the venting tube 52 is connected to the adaptor. The inner end portion of the passageway 132 in the adaptor 131 is rabbeted at 134 to provide a seat for the spring 135 which is compressed between the adaptor and the piston 51 in the inlet chamber 119.

The piston 51 is provided with a circumferentially extending groove 136 for receiving the O-ring 137 which seals between the piston and the wall of the inlet chamber 119. The portions of the chamber 119 on opposite sides of the piston 51 are in restricted communication with each other, however, through passageways 138 and 139 which extend through the piston and the latter of which has positioned therein a plug 141 that is formed of porous stainless steel, or the like. The inner end of the piston 51 has mounted thereon a sealing gasket 142 that is clamped against the end of the piston by the abutment 143 that is formed adjacent one end portion of the operating rod 144 which is threaded into the piston 51. A set screw 145 is threaded into the opposite end of the piston 51 for engaging the end of the operating rod 144 to prevent accidental loosening of the piston on the rod. The abutment 143 is adapted to seat in the rabbeted end 146 of the outlet chamber 121 to permit the sealing gasket 142 to seat against the end wall 147 of the inlet chamber 119 to seal between the inlet and outlet chambers.

Threaded onto the upper end portion of the operating rod 144 is an exhaust valve 148 which has a sealing washer 149 mounted thereon between the inner end of the valve and the abutment 151 adjacent the threaded end portion of the operating rod. A set screw 152 is threaded in the valve 148 into engagement with the end of the operating rod 144 to prevent accidental loosening of the valve on the operating rod. By reference to Figs. 9, 10 and 11, it will be readily apparent that the length of the operating rod 144 is such that when the piston 51 is in its normal position and the sealing gasket 142 is seated against the end wall 147 of the inlet chamber 119, the sealing washer 149 will be held in spaced relationship with the end wall 153 of the exhaust chamber 122 so that the exhaust and outlet ports 124 and 125, respectively, will be in open communication with each other. Movement of the piston 51 to move the sealing gasket 142 away from its seated position against the end wall 147, however, will cause the sealing washer 149 to engage the end wall 153 of the exhaust chamber 122 to seal between the outlet and the exhaust chambers 121 and 122, respectively, and to place the inlet chamber 119 in open communication with the outlet chamber.

The piston 51 is moved between the two positions described above in the following manner:

Assuming first that the venting tube 52 is closed so that carbon dioxide vapor flowing thereto will be trapped and will have its pressure increased, it will be readily apparent that carbon dioxide vapor flowing through the porous plug 141 and through the passageways 139 and 138 in the piston 51 will substantially equalize the pressures on opposite sides of the piston in the inlet chamber 119. The force exerted on the piston 51 by the spring 135 and by the pressure of the carbon dioxide acting on the larger exposed area of the piston in the lower portion of the inlet chamber 119 will cause the piston to move to a position at which the sealing gasket 142 is seated against the end wall 147 of the inlet chamber 119 to provide a seal between the inlet chamber and the outlet chamber 121. The piston 51 will be held in this position even though there is a slight unintentional leakage of carbon dioxide from the tube 52 because the carbon dioxide flowing through the plug 141 and passageways 139 and 138 will maintain the pressure in the lower portion of the inlet chamber 119 substantially equal to that on the opposite side of the piston.

A sudden discharge of the pressure from the venting tube 52, however, will reduce the forces acting on the outer end of the piston 51 to such an extent that the force exerted on the inner end of the piston by the pressure of the vapor in the adjacent portion of the inlet chamber 119 will move the piston to unseat the sealing gasket 142 from the end wall 147 and to cause the sealing washer 149 of the exhaust valve 148 to seat against the end wall 153 of the exhaust chamber 122. Carbon dioxide from the inlet chamber 119 will thereupon flow into the outlet chamber 121 and through the outlet port 125 into the passageway 126 and the bore 127 of the coupling sleeve 128. The piston 51 will remain in this position to unseat the sealing gasket 142 for so long as the flow of vapor from the venting tube 52 exceeds the rate of flow of vapor through the plug 141 and through the passageways 139 and 138 in the piston.

As illustrated in Figs. 8, 10, and 12 to 14, inclusive, the control valve 46 and its operating device 49 are mounted directly on the top of the actuating valve body 118 by means of through bolts 154 which extend upwardly through the valve body and are threaded into the control valve. It will also be noted by reference to Fig. 11 that the control valve 46 is provided with a recess 155 for receiving one end of the coupling sleeve 128. An O-ring 156 forms a seal between the sleeve 128 and the recess 155.

The body 157 of the control valve 46 has formed therein a passageway 158 that is aligned with the bore of the sleeve 128 and forms an inlet passageway for the control valve. The inlet passageway 158 communicates with a header 159 that is formed in the valve body 157 and communicates with an inlet chamber 161, a groove 162 in the upper surface of the valve body and a branch passageway 163 which leads to the operating device 49, as will be later described. The wall of the inlet chamber 161 is formed with a shoulder 164 which functions as a valve seat and the portion of the chamber below the shoulder communicates with an outlet passageway 165 the outer end portion of which is threaded to receive an adaptor 166 for connecting the pipe 45 to the control valve 46. A second outlet passageway 167 communicates with the portion of the inlet chamber above the shoulder 164 and is connected through a coupling member 168 to the pipe 56. The header 159 also communicates with the portion of the inlet chamber 161 above the shoulder 164.

Mounted in the inlet chamber 161 is a piston type valve 169 which carries a sealing washer 171 that is clamped between two threadedly connected portions of the valve. The sealing washer 171 is movable into seated relationship with the shoulder 164 to provide a seal between the two portions of the inlet chamber 169 that communicate with the header 159 and the outlet passageway 165.

Positioned over the top of the control valve body 157 is a flexible diaphragm 172 which has a central opening through which the threaded outer end portion 173 of the valve 169 projects. A second aperture 174 is formed in the diaphragm 172 and aligned with the passageway 163 from the header 159. Threaded onto the outer portion 173 of the valve 169 is a disc 175 which clamps the diaphragm therebetween. A spring guide 176 projects from the disc 175 for receiving a spring 177 that is compressed between the disc and the upper portion of a housing 178 for the operating device 49 of the control valve 46. The housing 178 is clamped to the body 157 of the control valve 46 by a plurality of cap screws 179, the diaphragm 172 being clamped between the control valve body and the housing.

The housing 178 has formed therein a passageway 181 that is aligned with the passageway 159 of the control valve body 157 and the opening 174 in the diaphragm 172 for the free flow of carbon dioxide vapor from the header 159 to the passageway 181. A plug 182 is threaded into a tapped opening in the housing 178 and has a circumferentially extending groove 183 formed therein in alignment with the passageway 181. Extending radially inwardly from the groove 183 are a plurality of passageways 184 which terminate at an axially arranged inwardly extending passageway 185. The passageway 185 has positioned therein a plug 186 that is formed of porous, stainless steel, or the like. The plug 182 is sealed against the side of the housing 178 by a sealing gasket 187 and is sealed inwardly of the groove 183 by an O-ring 188.

The action of the control valve operating device 49 to open and close the valve 169 will be described as follows:

Assuming first that the actuating valve 47 is in its normally closed position, the inlet chamber 161 of the control valve 46 will be in open communication with the atmosphere through the header 159, inlet passage 158, the bore 127 of the coupling sleeve 128, passageway 126 in the actuating valve body 118, the outlet chamber 121 and the exhaust chamber 122. The pressure within the chamber 189 in the housing 178 is also in communication with the atmosphere through the porous plug 186, passageways 185 and 184, passageway 181, opening 174 in the diaphragm 172, passageway 163, header 159, inlet passageway 158, the bore 127 of the sleeve 128, passageway 126 and through the outlet and exhaust chambers 121 and 122, respectively. The pressure on opposite sides of the diaphragm 172 being equal, therefore, the spring 177 will maintain the sealing washer 171 in seated engagement with the shoulder 164 to prevent the flow of carbon dioxide vapor into the outlet passage 165 of the control valve 46.

When the actuating valve 47 is opened by movement of the piston 51, carbon dioxide vapor is admitted to the outlet port 125 of the actuating valve for flow through the passageway 126, bore 127 of the sleeve 128, inlet passage 158 and header 159 to the inlet chamber 169, groove 162 and, at a retarded rate, to the chamber 189 in the housing 178. The pressure of the carbon dioxide vapor admitted to the groove 162 acting upon the entire undersurface of the diaphragm will move the disc 175 and the attached valve 169 against the force of the spring 177 to move the sealing washer 171 away from seated engagement with the shoulder 164 so that carbon dioxide vapor will flow freely from the header 159 into the outlet passageway 165 and the pipe 45. The restricted flow of gas into the chamber 189 within the housing 178, however, will gradually increase the pressure within the chamber to a value at which the force exerted by the gas on the upper side of the diaphragm 172 combined with the force exerted by the spring 177 will move the valve 169 to reseat the sealing washer 171 against the shoulder 164. The valve 169 will thereafter remain in its closed position so that no carbon dioxide vapor can flow from the header 159 to the outlet passage 165 until the inlet chamber 161 and the chamber 189 within the housing 178 have been vented to the atmosphere through the exhaust port 122 of the actuating valve 47 and the actuating valve has again been opened to admit carbon dioxide vapor to the control valve 46.

Immediately upon opening of the actuating valve 47, carbon dioxide vapor flowing to the inlet chamber 169 of the control valve 46 will flow into the discharge passageway 167 and into the pipe 56 connected thereto. This flow of vapor to the pipe 56 will create and maintain a higher pressure in the pipe until the actuating valve 47 has again been closed.

Referring now to Figs. 15 to 18, inclusive, for a detail description of the manually operated venting valve 53, and first particularly referring to Figs. 17 and 18, it will be seen that the valve body 191 has formed therein an inlet chamber 192 and an outlet chamber 193. The outlet chamber 193 communicates with the atmosphere through an outlet port 194 and the inlet chamber 192 communicates with the venting tube 53 through a passageway 195 in the adaptor 196 that is threaded into the outer end portion of the inlet chamber and through the coupling member 197 which connects the tube to the adaptor.

At the inner end of the passageway 195, the adaptor 196 is internally rabbeted to provide a spring seat 198 and a spring 199 is compressed between the spring seat and a piston-type valve 201 in the inlet chamber 192. The valve 201 is loosely fitted in the inlet chamber 192 to permit the free flow of carbon dioxide vapor thereby and the inner end of the valve has mounted thereon a sealing washer 202 which is clamped against the end of the valve by the enlarged head of a screw 203. The end of the outlet chamber 193 adjacent the valve 201 is rabbeted to provide a recess 204 for receiving the enlarged head of the screw 203 so that the sealing washer 202 can seat against the end wall 205 of the inlet chamber 192 to seal between the inlet and outlet chambers.

Adjacent the end of the outlet chamber 193 opposite the inlet chamber 192, the valve body 191 is recessed for receiving a plunger 206 which is positioned in the recess for sliding movement toward and away from the outlet chamber 193. Sealing is provided between the plunger 206 and its associated recess by the O-ring 207 and an operating rod 208 is threaded into the inner end of the plunger 206 and extends inwardly therefrom through the outlet chamber 193 and into engagement with the screw 203. Movement of the plunger 206 toward the outlet chamber 193, therefore, will cause the operating rod 208 to lift the valve 201 away from the position of engagement between the sealing washer 202 and the wall 205 of the inlet chamber 192 against the force exerted on the valve by the spring 199 and by the pressure of the gas in the inlet chamber. Movement of the sealing washer 202 away from its seated position against the end wall 205 will immediately release the carbon dioxide vapor from the venting tube 52 to quickly reduce the pressure in the venting tube and to thereby operate the actuating valve 47.

Referring now to Figs. 15 and 16 for a detail description of the mechanism for operating the plunger 206 to open the valve 201, it will be seen that a lever 209 is pivotally connected to a lug 211 which projects outwardly from the valve body 191 adjacent the plunger 206. One end of the lever 209 has threadedly connected thereto a lug 212 for adjustably engaging the outer end of the plunger 206 and the opposite end of the lever is pivotally connected to a link 213. The link 213 is in turn pivotally connected to a lever 214 that is mounted for pivotal movement on the valve body 191 by means of a bracket 215. As is best illustrated in Fig. 16, the two levers 209 and 214 and the link 213 form a toggle mechanism, the link 213 and the lever 214 being angularly related so that any relative pivotal movement between these members which tends to straighten the angle therebetween will effect a pivotal movement of the lever 209 to depress the plunger 206 and open the venting valve.

The valve body 191 together with its associated toggle mechanism are mounted in a housing 216 having a partition 217 therein. This partition slidably supports a push-button 218 that is aligned with the pivotal connection between the link 213 and lever 214 so that when the button is depressed the angle between the link and the lever will be straightened. The partition 217 is also provided with an opening 219 in alignment with the free end of the lever 214, the end of the lever being moved outwardly through the opening when the push-button 218 is depressed. A front piece 221 is detachably mounted on the housing 216 in outwardly spaced relationship from the partition 217. The front piece 221 is provided with a hinged door 222 which is normally held in its closed position by a latch 223 and which is movable to its open position by a handle 224 at the upper end of the door. The front piece 221 also supports a pane of glass 225 in front of the push-button 218 and an opening 226 is formed in the door in alignment with the glass pane and with the push-button so that the latter is visible when the door is in its normally closed position. Extending rearwardly and downwardly from the back of the door 222 is a hooked portion 227 which lies behind the glass pane 225 in surrounding relationship with the pushbutton 218 so that movement of the door to its open position will break the glass pane and expose the push-button 218 for manual operation.

By reference to Fig. 16 it will be seen that movement of the push-button 218 to straighten the angle between the link 213 and lever 214 may be continued slightly past that position at which the link and lever are aligned. This further movement of the link 213 and lever 214 into engagement with the valve body 191 will lock the valve in its open position until such time as the free end of the lever 214 is depressed either directly or by closing of the door 222. The venting valve 53 will thereupon be closed and will remain in its closed condition until the push-button 218 is again depressed. Of course, the front piece 221 must be removed from the housing 216 to replace the broken glass pane 225.

Referring now to Figs. 23 and 24 for a detail description of the venting head 54 for automatically opening the actuating valve 47 in response to the presence of a predetermined degree of temperature in the hazard to be protected by the system, the venting head is connected to the venting tube 52 by a coupling member 228. The coupling member 228 is threaded onto the body portion 229 of a yoke 231 having a passageway 232 therethrough in communication with the venting tube 52. Arms 233 extend arcuately outwardly from the body portion 229 of the yoke 231 and are joined in axially spaced relationship from the outer end of the passageway 232.

Positioned across the outer end of the passageway 232 in sealing relationship with the body portion 229 of the yoke 231 is a metal disc 234 which is held in place by a link 235 that extends outwardly from the disc through a heat collecting bell 236. The outer end of the link 235 is supported by its engagement with an L-shaped lever 237, one end of which is supported at the point of juncture between the two arms 233 and the opposite end of which is soldered to the heat collecting bell 236 with a soldered connection 238 having a predetermined melting temperature equal to the desired temperature at which the system is to be actuated.

When sufficient ehated air of the proper temperature flows around the heat collecting bell 236, the solder 238 will be melted to release one end of the lever 237. This lever will then fall away releasing the link 235 so that the disc 234 will fall away from, and open the outer end of, the passageway 232 so that the venting tube 52 will be quickly vented to reduce the pressure therein and to move the actuating valve 47 to its open position.

Referring now to Figs. 19 to 22, inclusive, for a detail description of the master pilot valve 30, it will be noted that the valve body 239 is provided with inlet, outlet and exhaust chambers 241, 242 and 243, respectively. These three chambers are in turn each provided with a port 244, 245 and 246 respectively, the inlet port being connected by an adaptor 247 to the first branch line 227, the outlet port 245 being connected by an adaptor 248 to the pipe 31 which leads to the operating port of the master valve and the exhaust port being open to the atmosphere.

The outer end of the inlet chamber 241 is closed by a plug 249, the inner end of which is recessed to provide a spring seat 251 for receiving the spring 252 which is compressed between the spring seat and a piston-type valve 253 that is positioned in loosely fitted relationship in the inlet chamber. The inner end of the valve 253 has mounted thereon a sealing washer 254 which is clamped against the end of the valve by the enlarged head of a screw 255. The end of the outlet chamber 242 adjacent the inlet chamber 241 is rabbeted to receive the enlarged head of the screw 255 so that the sealing washer 254 may seat against the end wall 256 of the inlet chamber to seal between the inlet and outlet chambers.

The outer end of the exhaust chamber 243 has threaded therein an adaptor 257 for threaded connection with the coupling member 258 of the pipe 43. The interior of the adaptor 257 is recessed to provide a bore 259 for receiving the piston 261 which is slidable along the bore. A seal is formed between the piston 261 and its bore 259 by an O-ring 262 and a sealing washer 263 is mounted on the inner end of the piston 261 and is clamped thereagainst by the enlargement 264 on the operating rod 265 that is threaded into the inner end of the piston and extends therefrom and into engagement with the head of the screw 255. Movement of the piston 261 inwardly, therefore, will cause the sealing washer 263 to engage the end wall of the exhaust chamber 243 to seal between the exhaust chamber and the outlet chamber 242 and will move the piston type valve 253 to a position at which the sealing washer 254 will be spaced from the end wall 256 of the inlet chamber 241 so that the inlet and outlet chambers are in open communication with each other. This movement of the piston 261 is effected by the admission of carbon dioxide vapor through the pipe 43 into the bore 259 and a subsequent release of the vapor through the pipe 43 will permit the spring 252 to return the valve 253 to its closed position at which the sealing washer 254 engages the end wall 256 of the inlet chamber 241 and the piston 261 is returned to its initial position.

In addition to the components described in detail above, the system illustrated in Fig. 1 includes a manual override valve 36 having a valve body 266 that is provided with inlet, outlet and exhaust chambers 267, 268 and 269, respectively, and with inlet, outlet and exhaust ports 271, 272 and 273 respectively.

The outer end of the inlet chamber 267 is closed by a plug 274 having a spring 275 compressed between the inner end thereof and a piston type valve 276 to urge the valve into a position at which the sealing washer 277 mounted thereon engages the inner end wall of the inlet chamber 267 to seal between the inlet chamber and the outlet chamber 268.

Mounted in the exhaust chamber 269 is a piston 278 and a seal is provided between the piston and the wall of the chamber by an O-ring 279. The inner end of the piston 279 has mounted thereon a sealing washer 281 which is movable into sealing engagement with the inner end wall of the exhaust chamber to seal between the exhaust chamber and the outlet chamber 268. An operating rod 282 projects inwardly from the piston 278 into engagement with the inner end of the piston 276 so that movement of the piston 278 to seat the washer 281 against the end wall of the exhaust chamber will cause the piston 276 to move to a position at which the washer 277 is spaced from the end wall of the inlet chamber 267.

Movement is imparted to the piston 278 by a cam wheel 283 which is mounted for rotation about a center of eccentricity 284 with the surface thereof in engagement with a lug 285 at the outer end of the piston. Rotation is imparted to the cam wheel 283 by a handle 286 that is rigidly connected thereto. It will be readily apparent that movement of the handle 236 to rotate the cam wheel 283 will selectively move the pistons 278 and 276 so that their associated sealing washers 281 and 277 will engage and be spaced from, respectively, the associated end walls of their chambers or will permit the spring 275 to move the pistons and their associated sealing washers so that the washer 277 engages the end wall of the inlet chamber and the washer 281 is spaced from the end wall of the exhaust chamber.

The system illustrated in Fig. 1 also includes a pair of shuttle valves 34 and 40 which are of identical construction and each of which includes a body member 287 having a cylindrical bore 288 formed therein with valve seats 289 at opposite ends of the bore. The admission of carbon dioxide vapor to the inlet at either end of the valve 34 or the valve 40 will move the shuttle 37 or 42 associated therewith to the opposite end of the bore 288 and will cause the shuttle to seat against the valve seat 289 at the end of the bore to which it is moved. The inlet to which carbon dioxide vapor is being admitted will thereby be placed in open communication with the outlet port 291 which extends radially outwardly from the middle of the bore 288.

As illustrated in Fig. 1, a conventional pressure gauge 292 may be connected to the venting tube 52 to indicate by the pressure in the venting tube whether or not the system is in a condition for operation.

It is also to be understood that the pressure switch 55 illustrated in Fig. 1 is a conventional type including electrical contactors that are operated by the admission of pressure fluid in such a manner that the contactors are closed when the pressure fluid is admitted to the switch and are open when the pressure fluid is vented therefrom.

Referring now to Fig. 25 for a detail description of the multiple hazard fire extingushing system and the manner in which the control device is employed for automatically controlling the discharge of fire extinguishing medium to the various hazards protected by the system, there are shown two hazards A and B which are to be protected by the system. A liquid carbon dioxide storage vessel 293 is located in the vicinity of the hazards A and B and is provided with a liquid header 294 which leads from the bottom portion of the container through the manually operated shut-off valve 295 and a piston operated master valve 296 to branch lines 297 and 298. The branch line 297 leads from the header 294 into the hazard A through a piston operated selector valve 299 and within the hazard is connected to a discharge header 301 having discharge nozzles 302 of a conventional design mounted thereon for discharging carbon dioxide into the hazard. The branch line 298 leads from the header 294 through a piston operated selector valve 303 to a discharge header 304 having nozzles 305 mounted thereon for discharging carbon dioxide directly onto the hazard B. It will be noted that the manually operated shut-off valve 295 is normally open and that the master valve 296 and selector valves 299 and 303 are normally closed.

Associated with each of the two hazards A and B is a control device C which includes a pilot valve assembly 32 along with its operating device 44 and actuating and control valves 46 and 47 as indicated by the portion of the system illustrated in Fig. 1 as being enclosed within the broken lines. The vapor supply pipe 26 leads from the vapor space of the storage vessel 293 and is connected by the first branch pipe 27 to the master pilot valve 30, by the second branch pipe 28 to the control device C associated with the hazard A and by the third branch pipe 29 to the manual override valve 36 associated with the hazard A. The control device C associated with the hazard B is connected to the supply pipe 26 by the branch pipe 28 and the manual override valve 36 associated with the hazard B is connected to the header by branch pipe 29 so that the control devices C associated with the two hazards A and B will operate in an identical manner.

Each of the two control devices C has a venting tube 52 leading therefrom to a manually operated venting valve 53. The venting tube associated with the control device for hazard A is additionally connected to three venting heads 54 that are located at spaced points within the hazard so as to detect a temperature increase within the hazard above a predetermined value. The venting tube 52 associated with a control device C for the hazard B is connected to a single venting head 54 positioned above the hazard to detect the presence of a temperature of a predetermined degree at this point. Each of the two control devices C is also provided with a tube 56 that is connected to a pressure responsive switch 55 for controlling the operation of an electrical siren or horn 306 which is supplied with electrical energy through the switch from lead wires 307.

The pipe 33 leading from the control device C associated with the hazard A is connected to one inlet of a shuttle valve 34, the outlet of which is connected by a pipe 38 to the operating piston of the selector valve 299 and through a pipe 39 to the inlet of a shutle valve 40. Vapor flowing through this pipe 33, therefore, will flow through the shuttle valve 34 and pipe 38 to open the selector valve 299 and through the pipe 39, shuttle valve 40 and pipe 43 to open the master pilot valve 30 so that vapor from the first branch pipe 27 will flow through the pipe 31 to open the master valve 296. Liquid carbon dioxide will thereupon immediately flow through the header 294 and branch line 297 to the header 301 for discharge from the nozzles 302 into hazard A. Of course, the delay before the discharge of carbon dioxide is initiated, and during which the alarm 306 will sound within the hazard A, and the timed discharge of carbon dioxide from the nozzles 302 is controlled by the device C in accordance with the previously described operation thereof.

When desirable, the discharge of carbon dioxide into the hazard A may be effected by operation of the manual override valve 36 which, when opened, will permit carbon dioxide vapor to flow directly from the supply pipe 26 through the third branch pipe 29 and pipe 35 to the shuttle valve 34. From the shuttle valve 34 the vapor will flow through pipe 38 to the selector valve 299 and through the pipe 39 to the shuttle valve 40. From the shuttle valve 40 the vapor will flow through pipe 43 to open the master pilot valve 30 and to thereby open the master valve 296. In this manner, both the selector valve 299 and master valve 296 may be opened and will remain open for so long as the manual override valve 36 is held in its open position.

When the control device C associated with the hazard B is set into operation by opening either the manual venting valve 53 or the venting head 54 and vapor is permitted to flow through the pipe 33, the flow of vapor is directed by the shuttle valve 34 into pipe 38 for opening the selector valve 303. Vapor will also flow through pipe 41 to the shuttle valve 40 and into pipe 43 to the master pilot valve 30 for opening the latter to permit carbon dioxide vapor to flow through the first branch pipe 27 and pipe 31 to open the master valve 296. Of course, the control device C will provide a predischarge delay period during which the alarm 306 will sound at the hazard B and the discharge of carbon dioxide subsequent to the opening of the master valve 296 and selector valve 303 will be timed in accordance with the operation of the control device as was previously described.

A manual override valve 36 is provided for effecting discharge of carbon dioxide from the nozzles 305 independently of the control device C associated therewith by admitting carbon dioxide vapor from the supply pipe 26 directly to the shuttle valve 34 for flow to the selector valve 303 and to the shuttle valve 40. The flow of vapor to the shuttle valve 40 is directed through pipe 43 to the master pilot valve 30 to open this valve and to thereby open the master valve 296.

Both of the hazards A and B are protected as described above by a system the operation of which is controlled to permit automatic or manual operation with a timed discharge of carbon dioxide at either of the two hazards following a delay period of predetermined duration which an alarm is sounded at the hazard. Alternatively, carbon dioxide may be discharged at either of the two hazards A or B independently of the control device associated therewith without a predischarge delay period and without a timed discharge period by operation of the manual override valve 36 associated with the particular hazard A or B.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, I claim:

1. A fire extinguishing system, comprising a source of stored liquid carbon dioxide, a delivery pipe connecting said source to a point of use, a normally closed piston operated valve for said pipe, a first duct for admitting carbon dioxide vapors from said source to the piston of said valve to open the latter, a pilot valve for said first duct, pressure responsive means for operating said pilot valve to open said first duct for a predetermined period of time, a second duct for admitting carbon dioxide vapor from said source to said pilot valve operating means to actuate said pilot valve operating means, an actuating valve for said second duct, a control valve for said second duct, pressure responsive means for operating said control valve to actuate said pilot valve operating means after said actuating valve has been open for a predetermined period of time, pressure responsive means for operating said actuating valve to actuate said control valve operating means, and means for energizing said actuating valve operating means to open said actuating valve.

2. A fire extinguishing system as defined in claim 1 further characterized by a branch duct for admitting carbon dioxide vapor from said source to the piston of said piston operated valve to open the latter, and a manually operated valve in said branch duct for opening the latter to open said piston operated valve independently of the operation of said pilot valve.

3. A fire extinguishing system as defined in claim 1 further characterized by pressure responsive alarm means connected to the portion of said second duct between said actuating and control valves and responsive to the opening of the actuating valve for sounding an alarm at said point of use of the carbon dioxide.

4. A fire extinguishing system as defined in claim 1 further characterized by said piston operated valve being located at a point in said pipe adjacent said point of use, a second normally closed piston operated valve located at a point in said pipe adjacent said source, a duct for admitting carbon dioxide vapor from said source to the piston of said second valve to open the latter, a pressure fluid operated pilot valve for the duct associated with said second valve, and means for admitting pressure fluid from the duct associated with the first mentioned piston operated valve to the pressure fluid operated pilot valve for opening the latter to cause both of said piston operated valves to open substantially simultaneously.

5. A fire extinguishing system as defined in claim 1 further characterized by the pressure responsive means for operating said actuating valve comprising a piston, means forming a cylinder for receiving said piston, and means for introducing carbon dioxide vapor from said source to said cylinder to urge the piston in a direction to close the valve, and said means for energizing said actuating valve operating means comprising a venting device responsive to a fire at the point of use of the carbon dioxide for automatically releasing carbon dioxide vapor from said cylinder to cause the piston to open said actuating valve.

6. A fire extinguishing system as defined in claim 5 further characterized by a manually operated valve for releasing carbon dioxide vapor from said cylinder to cause the piston to open said actuating valve.

7. In a fire extinguishing system, the combination with a source of stored liquid carbon dioxide, a pipe for delivering liquid carbon dioxide from said source to a point of use, a normally closed piston operated valve for said pipe and a pilot valve for admitting carbon dioxide vapor from said source to the piston of the piston operated valve to open the valve, of pressure responsive valve operating means for opening said pilot valve to open said piston operated valve for a predetermined period of time after a charge of pressure fluid is admitted to the operating means and the admission of the charge has been stopped, a duct for admitting carbon dioxide vapor from said source to said valve operating means, an actuating valve for opening and closing said duct, a control valve for said duct, pressure responsive means for opening said control valve when said actuating valve is opened to admit carbon dioxide vapor to said valve operating means and for closing said control valve after said actuating valve has been open for a predetermined period of time to stop the admission of carbon dioxide vapor to the valve operating means, pressure responsive means for opening said actuating valve, and means for automatically operating said actuating valve opening means when a fire occurs at said point of use of the carbon dioxide.

8. The combination defined in claim 7 further characterized by a pressure responsive switch connected to said duct between said control and actuating valves for energizing an alarm at the point of use of the carbon dioxide when said actuating valve is opened.

9. The combination defined in claim 7 further characterized by the means for opening said actuating valve comprising a piston connected to the valve, means forming a cylinder for receiving said piston, said duct introducing carbon dioxide vapor from said source to the portions of said cylinder on opposite sides of said piston for urging the piston in a direction to close said valve, and the means for operating said actuating valve opening means comprising a venting passageway from the portion of said cylinder on one side of the piston to an outlet at said point of use, and a closure for said outlet responsive to a fire at said point of use for opening said outlet to vent carbon dioxide from the portion of said cylinder on one side of said piston at a faster rate than the carbon dioxide is introduced thereto to cause the piston to open said actuating valve.

10. The combination defined in claim 9 further characterized by means forming a branch passageway from said venting passageway, and a valve normally closing said branch passageway and manually operable to open the passageway and to cause the piston to open said actuating valve.

11. The combination defined in claim 9 further characterized by said duct being in open communication with the portion of said cylinder on one side of said piston and in restricted communication with the portion of said cylinder on the opposite side of said piston, and said venting passageway extending from the portion of said cylinder in restricted communication with said duct, the restricted communication between said duct and said venting passageway maintaining the pressure in the latter substantially equal to the pressure in said duct until said outlet is opened.

12. The combination defined in claim 11 further characterized by said piston having a passageway therethrough providing communication between said duct and said venting passageway and a porous plug mounted in the passageway through said piston for restricting the flow of gas therethrough.

13. A device for controlling the actuation of a pressure fluid operated valve, comprising a pressure fluid supply duct, a pilot valve for said duct, pressure responsive means for operating said pilot valve to open said duct for a predetermined period of time after a charge of pressure fluid is admitted thereto and until a substantial portion of the charge has been vented therefrom, a second duct for admitting pressure fluid to said pilot valve operating means, an actuating valve for opening and closing said second duct, a control valve for opening and closing said second duct, pressure responsive means for opening said control valve when said actuating valve is opened to admit a charge of pressure fluid to said pilot valve operating means and for closing said control valve after said actuating valve has been open for a predetermined period of time to permit said charge to be vented from said pilot valve operating means, pressure responsive means for opening said actuating valve when the pressure therein is suddenly reduced, and means automatically responsive to a predetermined increase in the surrounding temperature for rapidly releasing the pressure from said means for opening the actuating valve.

14. A device as defined in claim 13 further characterized by a manually operable valve for rapidly releasing the pressure from said means for opening the actuating valve independently of the automatically responsive pressure releasing means.

15. A device as defined in claim 13 further characterized by said means for opening the actuating valve comprising a piston connected to the valve, means in open communication with one side of said piston and in restricted communication with the opposite side of said piston for supplying pressure fluid at equal pressures thereto, and a spring urging said piston in a direction to close the actuating valve and to maintain said valve in its closed position when the pressures on opposite sides of said piston are substantially equal, and said pressure releasing means comprising a venting duct in open communication with the side of the piston that is in restricted communication with the pressure fluid supplying means, and means normally closing said venting duct and responsive to a predetermined temperature increase for opening said venting duct to release pressure fluid therefrom at a greater rate than the pressure fluid is supplied through said restricted communication.

16. A device as defined in claim 15 further characterized by a branch duct leading from said venting duct, and a manually operable valve normally closing said branch duct and operable to open the branch duct and to cause said actuating valve opening means to open the actuating valve independently of the operation of said automatically responsive pressure releasing means.

References Cited in the file of this patent

UNITED STATES PATENTS

| | | |
|---|---|---|
| 2,074,157 | Allen | Mar. 16, 1937 |
| 2,090,279 | Allen | Aug. 17, 1937 |
| 2,356,990 | Getz | Aug. 29, 1944 |
| 2,368,212 | Grant | Jan. 30, 1945 |
| 2,630,867 | Heigis | Mar. 10, 1953 |